United States Patent
Matsuda

(10) Patent No.: US 9,547,614 B2
(45) Date of Patent: Jan. 17, 2017

(54) DEVICE MANAGEMENT SYSTEM, COMMUNICATION DEVICE, DEVICE MANAGEMENT APPARATUS, AND CONTROL METHOD

(71) Applicant: CANON KABUSHIKI KAISHA, Tokyo (JP)

(72) Inventor: Araki Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 14/561,738

(22) Filed: Dec. 5, 2014

(65) Prior Publication Data
US 2015/0161066 A1 Jun. 11, 2015

(30) Foreign Application Priority Data
Dec. 9, 2013 (JP) .................... 2013-254493

(51) Int. Cl.
*H04L 29/00* (2006.01)
*G06F 13/38* (2006.01)
*G06F 13/12* (2006.01)
*G06F 21/00* (2013.01)

(52) U.S. Cl.
CPC ........... *G06F 13/385* (2013.01); *G06F 13/122* (2013.01); *G06F 21/00* (2013.01)

(58) Field of Classification Search
CPC combination set(s) only.
See application file for complete search history.

(56) References Cited

U.S. PATENT DOCUMENTS

| 2008/0184351 A1* | 7/2008 | Gephart | G06F 21/33 726/7 |
| 2008/0233918 A1* | 9/2008 | Pousti | G06Q 20/04 455/408 |

FOREIGN PATENT DOCUMENTS

JP 2012-209936 A 10/2012

* cited by examiner

*Primary Examiner* — Ghazal Shehni
(74) *Attorney, Agent, or Firm* — Cowan, Liebowitz & Latman, P.C.

(57) ABSTRACT

There is provided a device management system. In the system, a first communication device sends a device ID and an owner identifier to a device management apparatus, and receives a first confirmation code. The device management apparatus receives the device ID and the owner identifier, generates the first confirmation code and provisional registration information, records the received and generated information items, sends the first confirmation code to the first communication device, and sends the provisional registration information to a second communication device. The second communication device receives the provisional registration information, obtains a second confirmation code, and sends the second confirmation code to the device management apparatus. The device management apparatus receives the second confirmation code, and records registration completion information if the second confirmation code matches the corresponding first confirmation code.

14 Claims, 11 Drawing Sheets

F I G. 4A

| DEVICE ID | DEVICE-SPECIFIC INFORMATION | REGISTRATION STATE | CONFIRMATION CODE | OWNER IDENTIFIER | PROVISIONAL REGISTRATION INFORMATION | PROVISIONAL REGISTRATION EXPIRATION DATE | SERVICE USAGE ID |
|---|---|---|---|---|---|---|---|
| 0x000a | 0 | REGISTERED | 4657 | aaa@... | hhh://www... | ... | xxx |
| 0x000b | 1 | PROVISIONAL REGISTRATION | 0245 | bbb@... | hhh://www... | ... | |
| 0x000c | 2 | NO REGISTRATION | 8163 | | | | |
| 0x000d | 3 | NO REGISTRATION | | | | | |

401 402 403 404 405 406 407 408

F I G. 4B

| OWNER IDENTIFIER | PASSWORD |
|---|---|
| aaa@... | ... |

409 410

DEVICE MANAGEMENT SYSTEM, COMMUNICATION DEVICE, DEVICE MANAGEMENT APPARATUS, AND CONTROL METHOD

BACKGROUND OF THE INVENTION

Field of the Invention

The present invention relates to a device management system, a communication device, a device management apparatus, and a control method.

Description of the Related Art

Conventionally, pairing between communication devices has been performed. As one example, pairing between a transmission device and a response device via a cooperative control apparatus will now be described. First, the transmission device obtains a transmission code from the cooperative control apparatus and displays the transmission code. Here, the cooperative control apparatus stores the transmission code in association with an identifier of the transmission device. Next, in accordance with an operation of a user who has seen the transmission code displayed on the transmission device, the response device inputs the transmission code and sends the transmission code to the cooperative control apparatus. Upon receiving the transmission code, the cooperative control apparatus generates a reply code and sends the reply code to the response device. Here, the response device stores the reply code in association with the identifier of the transmission device. Then, the response device receives the reply code from the cooperative control apparatus and displays the reply code. Meanwhile, the transmission device receives a list of reply codes associated with its own identifier from the cooperative control apparatus, and displays the list of reply codes. The user cross-references the list of reply codes displayed on the transmission device with the reply code displayed on the response device, and if there is a matching reply code, the transmission device selects the matching reply code and notifies the cooperative control apparatus of the same. Then, the cooperative control apparatus stores pairing between the transmission device and the response device as authenticated pairing (see Japanese Patent Laid-Open No. 2012-209936).

However, Japanese Patent Laid-Open No. 2012-209936 handles pairing between communication devices, but does not handle pairing between a communication device and its owner.

SUMMARY OF THE INVENTION

The present invention has been made in view of the foregoing situation, and provides technology that allows pairing between a communication device and its owner to be set in a simple procedure.

According to a first aspect of the present invention, there is provided a device management system including a first communication device, a second communication device, and a device management apparatus, the first communication device comprising: a sending unit configured to send a device ID of the first communication device and an owner identifier corresponding to an owner of the first communication device to the device management apparatus; a receiving unit configured to receive a first confirmation code associated with the device ID from the device management apparatus; and a display unit configured to display the first confirmation code, the device management apparatus comprising: a receiving unit configured to receive the device ID and the owner identifier from the first communication device; a generation unit configured to generate the first confirmation code and provisional registration information that includes information for accessing the device management apparatus and is unique to the device ID; a recording unit configured to record the device ID, the owner identifier, the first confirmation code, and the provisional registration information in association with one another; and a sending unit configured to send the first confirmation code to the first communication device and send the provisional registration information to the second communication device, and the second communication device comprising: a receiving unit configured to receive the provisional registration information from the device management apparatus; an obtaining unit configured to obtain a second confirmation code input via an input interface; and a sending unit configured to send the second confirmation code to the device management apparatus by accessing the device management apparatus in accordance with the provisional registration information, wherein the receiving unit of the device management apparatus receives the second confirmation code from the second communication device, the device management apparatus further comprises a determination unit configured to determine whether or not the second confirmation code matches the first confirmation code associated with the provisional registration information that has been used by the sending unit of the second communication device to send the second confirmation code, and if it is determined that the second confirmation code matches the first confirmation code, the recording unit of the device management apparatus records registration completion information indicating that registration of a pair of the device ID and the owner identifier associated with the provisional registration information has been completed.

According to a second aspect of the present invention, there is provided a communication device comprising: a sending unit configured to send a device ID of the communication device and an owner identifier corresponding to an owner of the communication device to a device management apparatus; a receiving unit configured to receive a first confirmation code associated with the device ID from the device management apparatus; and a display unit configured to display the first confirmation code.

According to a third aspect of the present invention, there is provided a device management apparatus comprising: a receiving unit configured to receive a device ID of a first communication device and an owner identifier corresponding to an owner of the first communication device from the first communication device; a generation unit configured to generate a first confirmation code and provisional registration information that includes information for accessing the device management apparatus and is unique to the device ID; a recording unit configured to record the device ID, the owner identifier, the first confirmation code, and the provisional registration information in association with one another; and a sending unit configured to send the first confirmation code to the first communication device and send the provisional registration information to a second communication device, wherein the receiving unit receives, from the second communication device, a second confirmation code that has been sent in accordance with the provisional registration information, the device management apparatus further comprises a determination unit configured to determine whether or not the second confirmation code matches the first confirmation code associated with the provisional registration information that has been used by the second communication device to send the second confirmation code, and if it is determined that the second confirmation code matches the first confirmation code, the recording unit records registration completion information indicating that registration of a pair of the device ID and the owner identifier associated with the provisional registration information has been completed.

According to a fourth aspect of the present invention, there is provided a communication device comprising: a receiving unit configured to receive, from a device management apparatus, provisional registration information that includes information for accessing the device management apparatus and is unique to a device ID of another communication device; an obtaining unit configured to obtain a second confirmation code input via an input interface; and a sending unit configured to send the second confirmation code to the device management apparatus by accessing the device management apparatus in accordance with the provisional registration information.

According to a fifth aspect of the present invention, there is provided a control method for a communication device, the control method comprising: a sending step of sending a device ID of the communication device and an owner identifier corresponding to an owner of the communication device to a device management apparatus; a receiving step of receiving a first confirmation code associated with the device ID from the device management apparatus; and a display step of displaying the first confirmation code.

According to a sixth aspect of the present invention, there is provided a control method for a device management apparatus, the control method comprising: a receiving step of receiving a device ID of a first communication device and an owner identifier corresponding to an owner of the first communication device from the first communication device; a generation step of generating a first confirmation code and provisional registration information that includes information for accessing the device management apparatus and is unique to the device ID; a recording step of recording the device ID, the owner identifier, the first confirmation code, and the provisional registration information in association with one another; and a sending step of sending the first confirmation code to the first communication device and sending the provisional registration information to a second communication device, wherein in the receiving step, a second confirmation code that has been sent in accordance with the provisional registration information is received from the second communication device, the control method further comprises a determination step of determining whether or not the second confirmation code matches the first confirmation code associated with the provisional registration information that has been used by the second communication device to send the second confirmation code, and if it is determined that the second confirmation code matches the first confirmation code, registration completion information is recorded in the recording step, the registration completion information indicating that registration of a pair of the device ID and the owner identifier associated with the provisional registration information has been completed.

According to a seventh aspect of the present invention, there is provided a control method for a communication device, the control method comprising: a receiving step of receiving, from a device management apparatus, provisional registration information that includes information for accessing the device management apparatus and is unique to a device ID of another communication device; an obtaining step of obtaining a second confirmation code input via an input interface; and a sending step of sending the second confirmation code to the device management apparatus by accessing the device management apparatus in accordance with the provisional registration information.

Further features of the present invention will become apparent from the following description of exemplary embodiments with reference to the attached drawings.

BRIEF DESCRIPTION OF THE DRAWINGS

FIG. 4A shows a pairing management table stored in the device management apparatus according to the embodiment of the present invention.

FIG. 4B shows a user management table stored in the device management apparatus according to the embodiment of the present invention.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
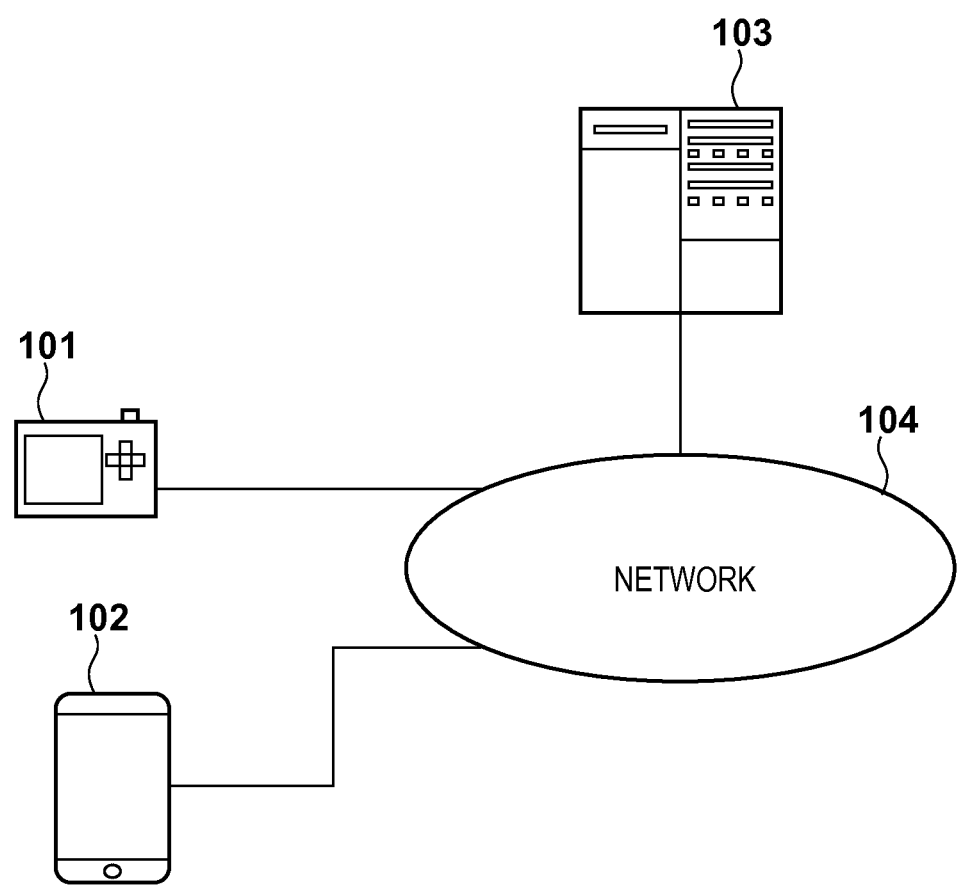
FIG. 1 is a block diagram showing one example of a configuration of a device management system according to an embodiment of the present invention.

One example of a configuration of a device management system according to the present embodiment will now be described with reference to a block diagram of FIG. 1. A first communication device 101 and a second communication device 102 can communicate with a device management apparatus 103 via a network 104. In the present embodiment, in order to realize pairing between the first communication device 101 and an owner who is considered a service user, the first communication device 101 and the second communication device, which is operated by the user, communicate with the device management apparatus 103 on an individual basis.

The first communication device 101 and the second communication device 102 establish communication with the device management apparatus 103 using a protocol such as HTTP, and obtain page information described in a language such as HTML and XML. The first communication device 101 and the second communication device 102 analyze the page information, and display various types of data based on the result of analysis.

The first communication device 101 and the second communication device 102 may be any device with a communication function, and are realized by, for example, a digital camera, a smartphone, a tablet, a personal computer, and a storage with a communication function. The device management apparatus 103 is realized by, for example, a server computer; it may be realized by a single server computer, and may be realized by a plurality of server computers to which functions are distributed as necessary.

While the present embodiment will be described below based on an exemplary case in which the first communication device 101 and the second communication device 102 are a digital camera and a smartphone, respectively, the present embodiment can be realized similarly in a case where these devices are something else.

Figure 2:
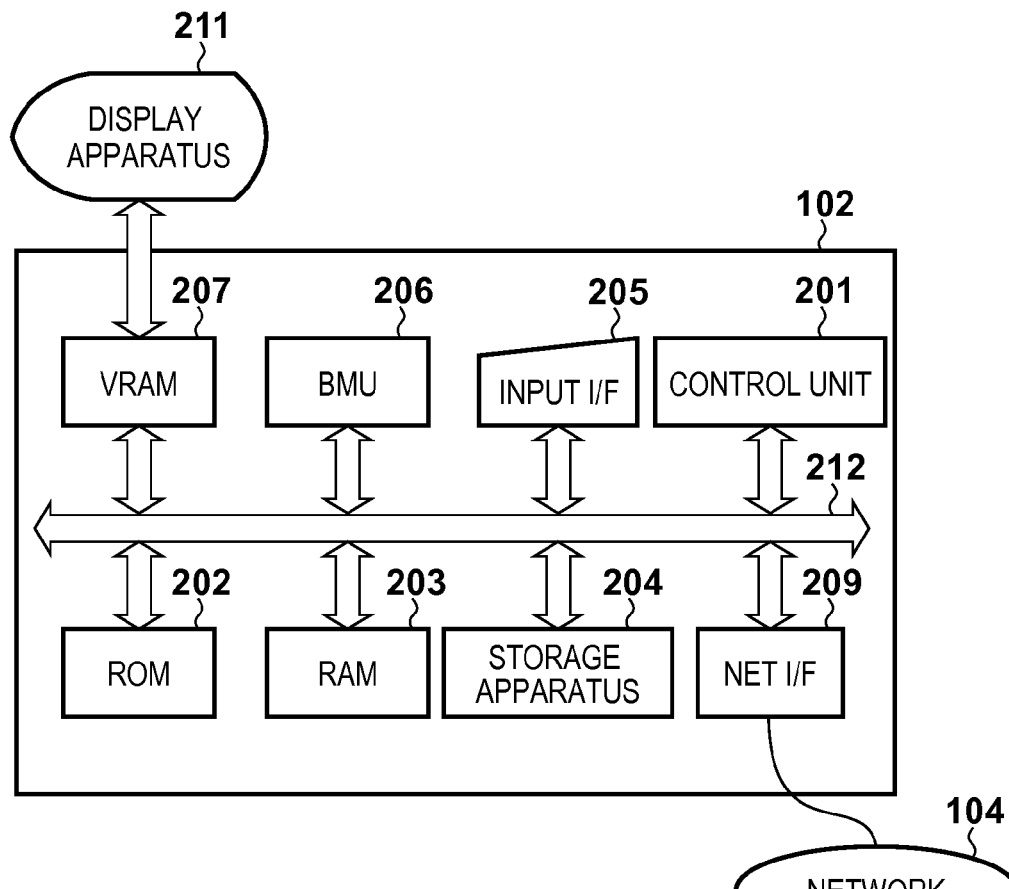
FIG. 2 is a block diagram showing an example of a configuration of an information processing apparatus that realizes a second communication device and a device management apparatus according to the embodiment of the present invention.
Figure 2:
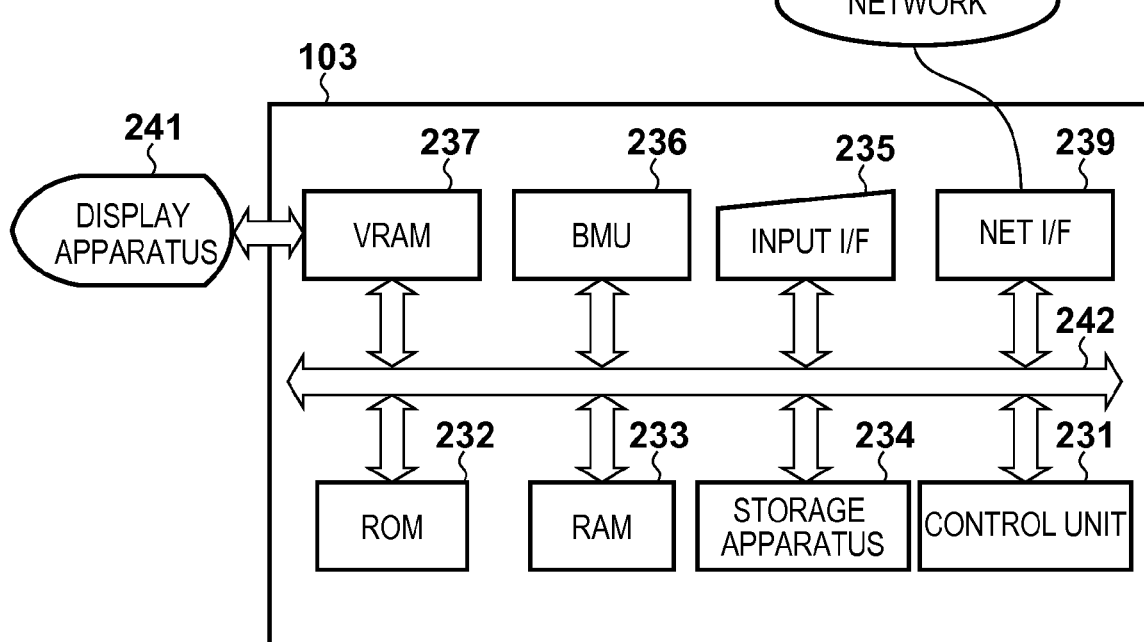

A description is now given of a configuration of an information processing apparatus that realizes a server computer representing the device management apparatus 103 or a smartphone representing the second communication device 102 with reference to a block diagram of FIG. 2.

The device management apparatus 103 and the second communication device 102 may each be realized by a single information processing apparatus, and may be realized by a plurality of information processing apparatuses to which functions are distributed as necessary. In the latter case, the plurality of information processing apparatuses are connected by a Local Area Network (LAN) and the like in such a manner that they can communicate with one another.

In FIG. 2, control units 201 and 231 are, for example, central processing units (CPUs), and control an entirety of the second communication device 102 and an entirety of the device management apparatus 103, respectively. Read-only memories (ROMs) 202 and 232 store programs and parameters that need not be changed. Random-access memories (RAMs) 203 and 233 temporarily stores programs and data supplied from an external apparatus and the like. Storage apparatuses 204 and 234 are, for example, hard disk drives (HDDs) that are fixedly arranged in the second communication device 102 and the device management apparatus 103, respectively. Alternatively, they are solid-state drives (SSDs) constituted by a flash memory, hybrid drives constituted by a combination of a hard disk and a flash memory, memory cards, and the like. The storage apparatuses 204 and 234 store programs such as an operating system (OS). Upon accepting an operation of a user, input interfaces (I/Fs) 205 and 235 connect to an input apparatus for data input, such as a pointing device, keyboard, and touchscreen. Bit move units (BMUs) 206 and 236 control data transfer, for example, between memories (e.g., between VRAMs 207, 237 and another memory) and between a memory and I/O devices (e.g., network interfaces 209, 239). The video RAMs (VRAMs) 207 and 237 render images to be displayed on display apparatuses 211 and 241, respectively. Images generated in these VRAMs 207 and 237 are sent to the display apparatuses 211 and 241 in accordance with predetermined regulations, and the display apparatuses 211 and 241 accordingly display the images. The network interfaces 209 and 239 connect to the network 104. The components 201 to 209 and 231 to 239 are connected via system buses 212 and 242, respectively, in such a manner that they can communication with one another.

Figure 3:
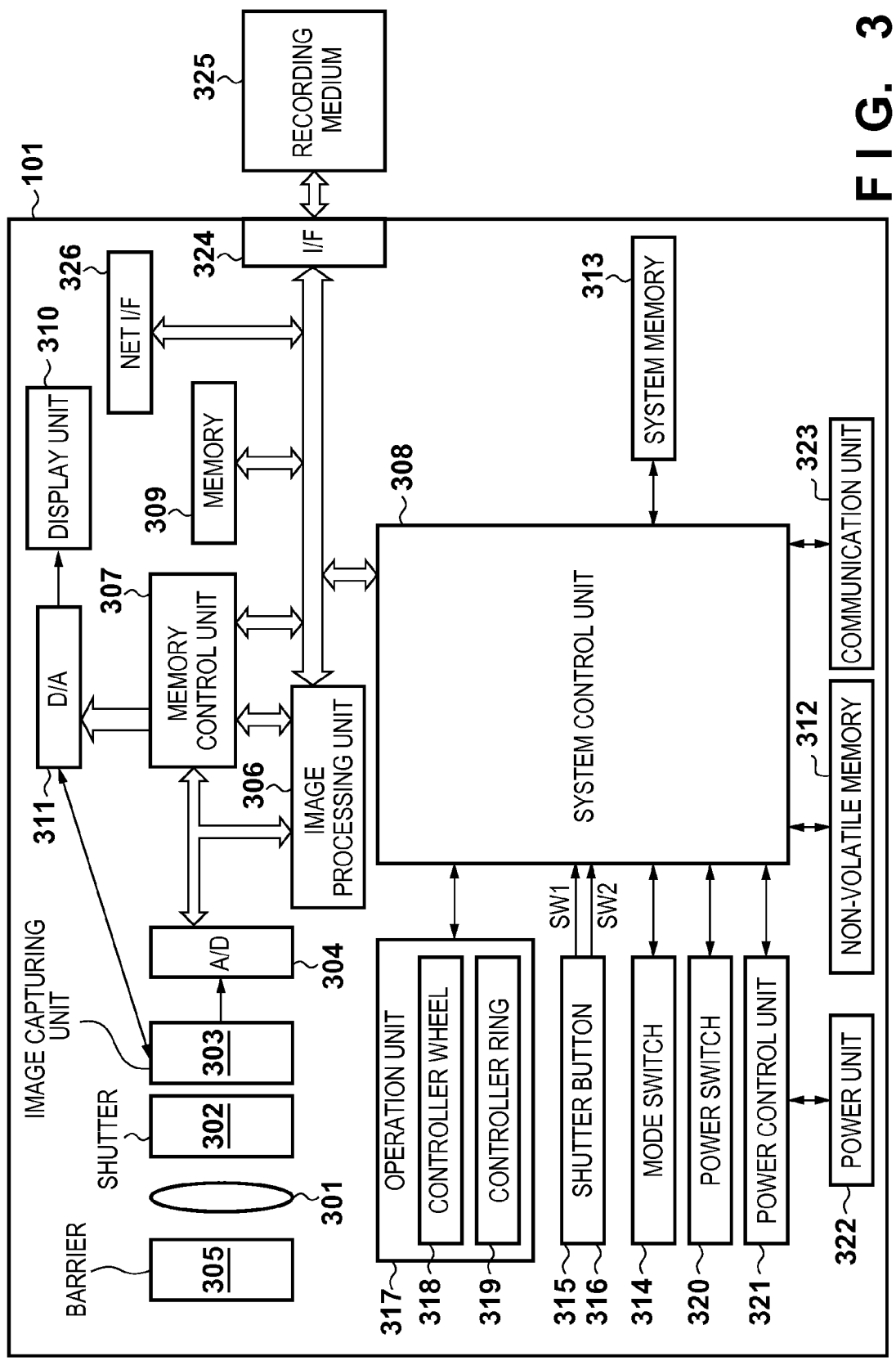
FIG. 3 shows one example of an image capturing apparatus that constitutes a digital camera representing a first communication device according to the embodiment of the present invention.

A configuration of an image capturing apparatus that realizes the digital camera representing the first communication device 101 will now be described with reference to a block diagram of FIG. 3. It should be noted that the first communication device 101 may be realized by a single image capturing apparatus, and may be realized by being connected to external devices to which functions are distributed as necessary.

Reference numeral 301 denotes image capturing lenses including a focus lens. Reference numeral 302 denotes a shutter with aperture functions. Reference numeral 303 denotes an image capturing unit constituted by a CCD element, a CMOS element, and the like that convert an optical image into an electrical signal. Reference numeral 304 denotes an A/D converter; the A/D converter 304 converts an analog signal output from the image capturing unit 303 into a digital signal. Reference numeral 305 denotes a barrier; the barrier 305 covers the image capturing lenses 301 and the like so as to prevent stains and damages of an image capturing system including the image capturing lenses 301, the shutter 302, and the image capturing unit 303. Reference numeral 306 denotes an image processing unit; the image processing unit 306 applies predetermined pixel interpolation, resize processing such as reduction, and color conversion processing to image data from the A/D converter 304 or to image data from a memory control unit 307. The image processing unit 306 also executes predetermined calculation processing using captured image data, and a system control unit 308 performs exposure control and range control based on the result of calculation. Image data output from the A/D converter 304 is written to a memory 309 via the image processing unit 306 and the memory control unit 307, or via the memory control unit 307 only. The memory 309 stores image data that has been obtained by the image capturing unit 303 and converted into digital data by the A/D converter 304, and image data to be displayed on a display unit 310. The memory 309 has a storage capacity sufficient to store a predetermined number of still images, and a video and audio of a predetermined time length. The memory 309 also functions as a memory for image display (a video memory). Reference numeral 311 denotes a D/A converter; the D/A converter 311 converts image data for image display stored in the memory 309 into an analog signal, and supplies the analog signal to the display unit 310. In this way, image data for image display written to the memory 309 is displayed on the display unit 310 via the D/A converter 311. The display unit 310 displays material corresponding to the analog signal from the D/A converter 311 on a display such as an LCD. Reference numeral 312 denotes a non-volatile memory; the non-volatile memory 312 is an electrically erasable and recordable memory, and an EEPROM and the like are used thereas.

The non-volatile memory 312 stores, for example, a constant for an operation of the system control unit 308, and a control program such as a program for performing later-described pairing. Reference numeral 308 denotes a system control unit; the system control unit 308 controls an entirety of the first communication device 101. The system control unit 308 realizes processing of the first communication device 101 by executing a program stored in the non-volatile memory 312. Reference numeral 313 denotes a system memory such as a RAM; a constant and variable for the operation of the system control unit 308, a program read from the non-volatile memory 312, and the like are deployed into the system memory 313.

Reference numeral 314 denotes a mode switch. Reference numeral 315 denotes a first shutter switch.

Reference numeral 316 denotes a second shutter switch. Reference numeral 317 denotes an operation unit. The mode switch 314, first shutter switch 315, second shutter switch 316, and operation unit 317 are operation units for inputting various types of operational instructions to the system control unit 308. The mode switch 314 switches an operation mode of the system control unit 308 to one of a still image recording mode, a video recording mode, a reproduction mode, and the like. During an operation on a shutter button included in the first communication device 101, that is to say, when the shutter button is pressed halfway down (an instruction for preparation of image capture), the first shutter switch 315 is turned on and issues a first shutter switch signal SW1. When the operation on the shutter button is completed, that is to say, when the shutter button is pressed all the way down (an instruction for image capture), the second shutter switch 316 is turned on and issues a second shutter switch signal SW2. With the second shutter switch signal SW2, the system control unit 308 starts the operations corresponding to a sequence of image capture processes, from reading of a signal from the image capturing unit 303 to writing of image data to a recording medium 325. For example, when an operation of selecting various function icons displayed on the display unit 310 has been performed, operation members of the operation unit 317 are assigned appropriate functions on a scene-by-scene basis, thereby serving as various types of function buttons. The function buttons include a confirmation button, a stop button, a return button, an image switch button, a jump button, a narrow-down button, an attribute change button, and the like. For example, when a menu button is pressed, the display unit 310 displays a menu screen on which various types of settings can be made. The user can make various types of settings intuitively using the menu screen displayed on the display unit 310, four-directional buttons, and a SET button. Reference numeral 318 denotes a controller wheel, which is a rotatable operation member included in the operation unit 317 and is used to, for example, issue an instruction for selecting an item together with a directional button. The system control unit 308 controls the components of the first communication device 101 based on a pulse signal. The system control unit 308 can also determine, for example, an angle by which the controller wheel 318 was rotated and the number of times it was rotated based on the pulse signal. It should be noted that the controller wheel 318 may be any operation member that can detect a rotational operation. Reference numeral 319 denotes a controller ring, which is a rotatable operation member included in the operation unit 317 and can be rotated about an optical axis around a lens barrel. For example, by operating the controller ring 319, an electrical pulse signal corresponding to a rotation amount (an operation amount) is generated. The system control unit 308 controls the components of the first communication device 101 based on a pulse signal. When a function switch button of the controller ring 319 included in the operation unit 317 is pressed, the display unit 310 displays a menu screen on which a function assigned to the controller ring 319 can be changed. The controller ring 319 and the controller wheel 318 are used to select normal mode items and change values.

Reference numeral 320 denotes a power switch; the power switch 320 is for switching between power-on and power-off. Reference numeral 321 denotes a power control unit; the power control unit 321 is constituted by a battery detection circuit, a DC-to-DC converter, a switch circuit for switching among blocks to which current is supplied, and the like. The power control unit 321 detects whether or not a battery is attached, a type of the battery, and a remaining battery level. The power control unit 321 also controls the DC-to-DC converter based on the result of detection and an instruction of the system control unit 308, and supplies necessary voltage to various components including the recording medium 325 for a necessary period of time. Reference numeral 322 denotes a power unit; the power unit 322 is constituted, for example, by a primary battery such as an alkaline battery and a lithium battery, by a secondary battery such as a NiCd battery, a NiMH battery and a Li battery, and by an AC adaptor. Reference numeral 323 denotes a communication unit; the communication unit 323 sends an image stored in the recording medium 325 to an external device. Reference numeral 324 denotes an interface for the recording medium 325, and the recording medium 325 is constituted by a semiconductor memory, a magnetic disk, and the like. Reference numeral 326 denotes a network I/F that communicates with an external device via the network 104 under control of the system control unit 308.

The device management apparatus 103 according to the present embodiment stores a pairing management table and a user management table. A description is now given of information therein with reference to FIGS. 4A and 4B.

FIG. 4A shows the pairing management table. The pairing management table includes a device ID 401, device-specific information 402, registration state 403, confirmation code 404, owner identifier 405, provisional registration information 406, a provisional registration expiration date 407, and a service usage ID 408.

The device ID 401 is for identifying a pair of the first communication device 101 and the owner in a network service according to the present embodiment. When a request including the device-specific information 402 is sent to the device management apparatus 103 through the owner's operation on the first communication device 101, the device management apparatus 103 issues a device ID. The device ID is unique and does not match any of the values of other device IDs that have already been issued.

The device-specific information 402 is a value with which the first communication device 101 can be uniquely identified. The registration state 403 indicates a registration state of the device ID, and in the network service, whether or not a service tied to the device ID can be provided is determined based on the registration state. The registration state comes in three types: official registration, provisional registration, and no registration; the service is provided only to a device ID whose registration state indicates official registration.

The confirmation code 404 is information for confirming that a person targeted for user registration is the owner of the first communication device 101, and is a short character string composed of numbers and alphabets. The owner identifier 405 is information for identifying the owner of the first communication device 101, and is a mail address of the owner in the present embodiment.

The provisional registration information 406 is a URL of a web page. This provisional registration information is also unique. This provisional registration information has a sufficient length to prevent unauthorized access. The provisional registration expiration date 407 is set based on the date and time when provisional registration is performed. The service usage ID 408 will be described later.

FIG. 4B shows the user management table. The user management table includes an owner identifier 409 and a password 410. The device management apparatus 103 according to the present embodiment performs user authentication based on this user management table.

An owner identifier of the first communication device 101 whose registration state 403 indicates official registration in the pairing management table is registered as the owner identifier 409. A unique constraint is set for the owner identifier. The password 410 is information for user authentication, and is an arbitrary character string designated by the owner at the time of user registration.

Figure 5:
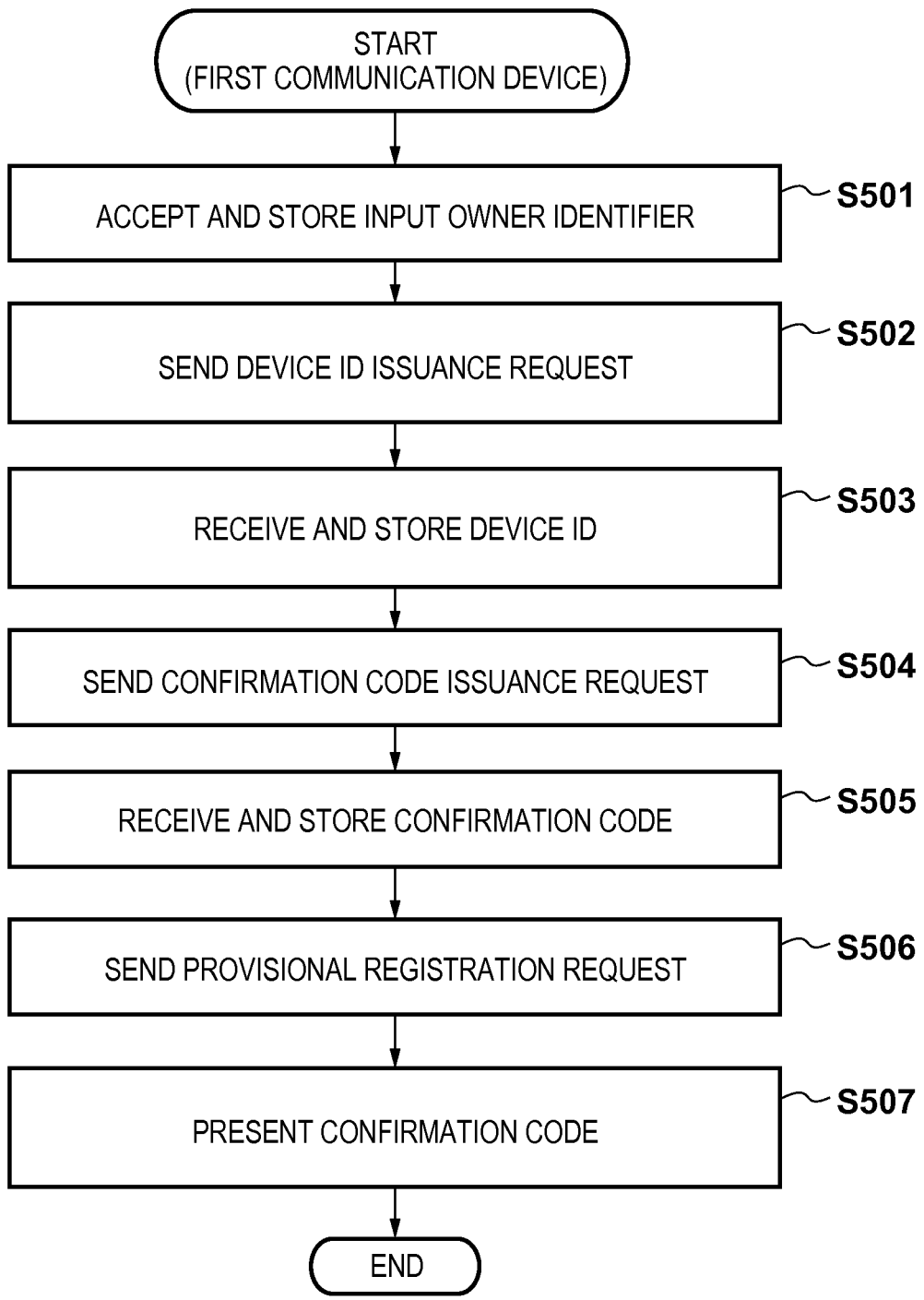
FIG. 5 is a flowchart showing the flow of pairing setting processing and user registration processing in the first communication device.
Figure 6:
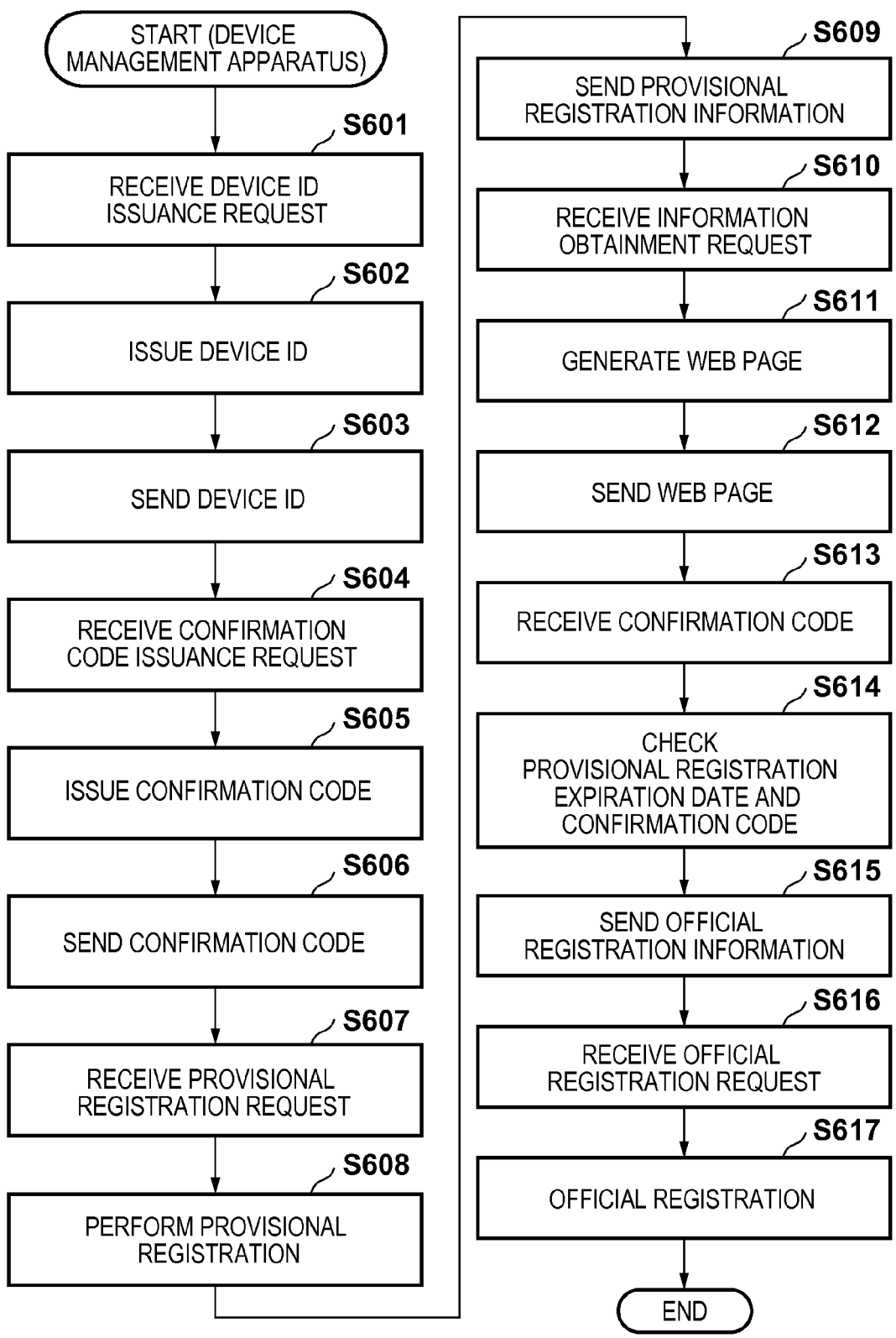
FIG. 6 is a flowchart showing the flow of pairing setting processing and user registration processing in the device management apparatus.
Figure 7:
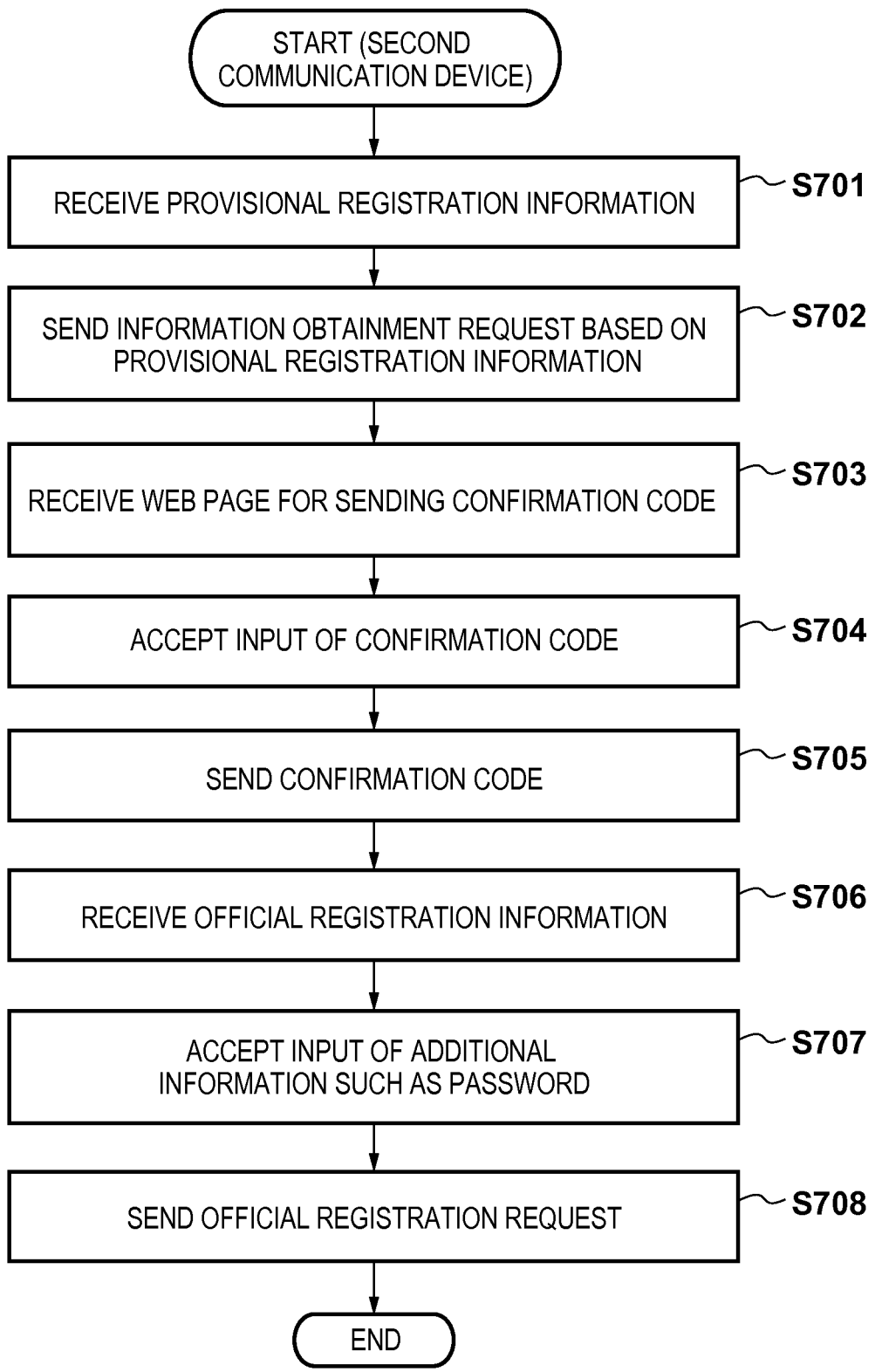
FIG. 7 is a flowchart showing the flow of pairing setting processing and user registration processing in the second communication device.

The following describes the flow of processing for setting pairing between the first communication device 101 and its owner with reference to FIGS. 4A to 9B. FIGS. 5, 6, and 7 are flowcharts showing the flow of pairing setting processing and user registration processing in the first communication device 101, the device management apparatus 103, and the second communication device 102, respectively.

Figure 8A:
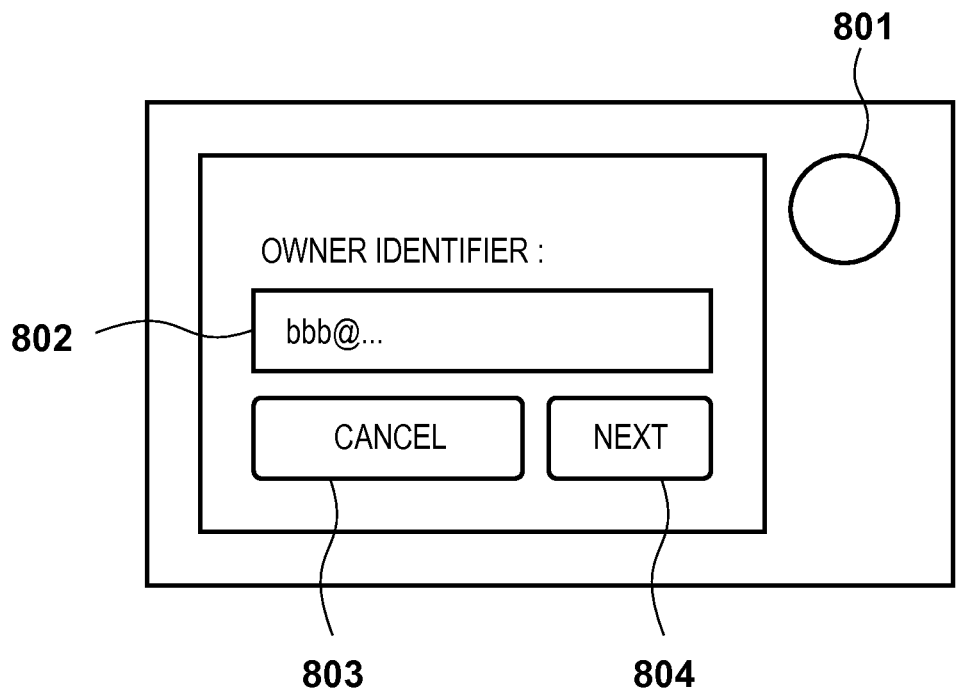
FIGS. 8A and 8B show screens displayed on a display unit of the first communication device.
Figure 8B:
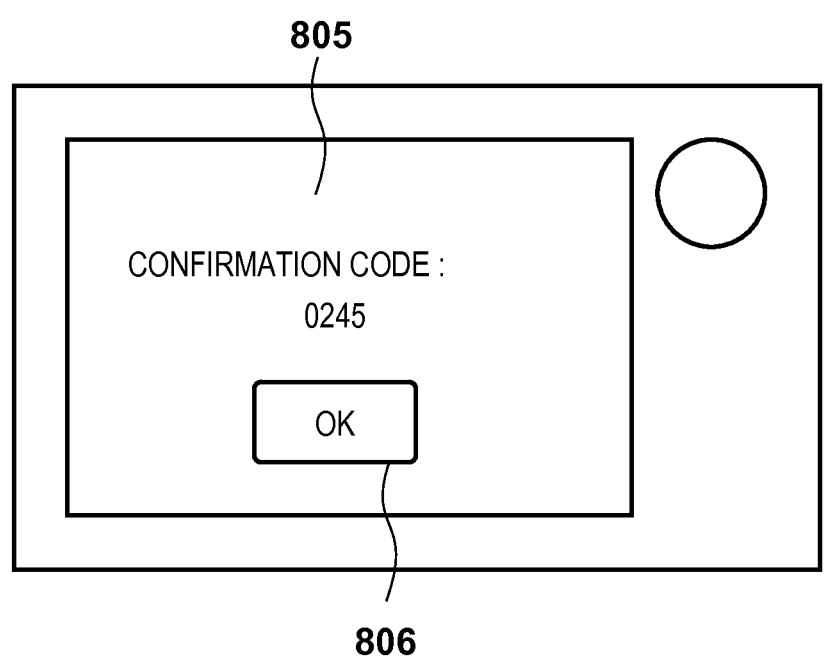

Screens displayed on the display unit 310 of the first communication device 101 will be described below with reference to FIGS. 8A and 8B. The user performs a selection operation on the first communication device 101 by operating the operation unit 317. While the operation unit 317 represents a key in examples shown in FIGS. 8A and 8B, a touchscreen mounted on the display unit 310 may be operated. Screens displayed on the display apparatus 211 of the second communication device 102 will also be described below with reference to FIGS. 9A and 9B. The user performs a selection operation on the second communication device 102 by operating an input apparatus connected to the input I/F 205, such as a pointing device, a keyboard, and a touchscreen.

The first communication device 101 and the second communication device 102 are operated by the same operator in general, and therefore the operator is hereinafter referred to as the owner as a whole.

First, in step S501, the system control unit 308 of the first communication device 101 accepts and stores an owner identifier input through an operation of the owner. FIG. 8A shows a screen displayed on the first communication device 101 at this time. Reference numeral 801 denotes a button included in the operation unit 317. The following are arranged on the display unit 310 of the first communication device 101: an owner identifier 802 input by the owner through the operation unit 317, a cancel button 803 for cancelling the input, and a button 804 that accepts an instruction for proceeding with processing.

If the owner selects the button 804, the system control unit 308 of the first communication device 101 sends a device ID issuance request to the device management apparatus 103 in step S502. This device ID issuance request includes device-specific information of the first communication device 101, but need not include the owner identifier.

Moving to FIG. 6, in step S601, the control unit 231 of the device management apparatus 103 receives the device ID issuance request sent from the first communication device 101. Then, the control unit 231 issues a device ID in step S602. At this time, the control unit 231 stores the device-specific information included in the device ID issuance request and the issued device ID, in association with each other, into the pairing management table shown in FIG. 4A. In FIG. 4A, a record including a device ID of 0x000d pertains to the present situation. Thereafter, the control unit 231 sends the device ID to the first communication device 101 in step S603.

Returning to FIG. 5, in step S503, the system control unit 308 of the first communication device 101 receives and stores the device ID sent from the device management apparatus 103. Next, in step S504, the system control unit 308 sends a confirmation code issuance request to the device management apparatus 103. This confirmation code issuance request includes the device ID stored in step S503.

Moving to FIG. 6 again, in step S604, the control unit 231 of the device management apparatus 103 receives the confirmation code issuance request sent from the first communication device 101. Then, the control unit 231 issues a confirmation code in step S605. At this time, based on the device ID included in the confirmation code issuance request, the control unit 231 searches the pairing management table shown in FIG. 4A for a corresponding record, and stores the issued confirmation code into the corresponding record. In FIG. 4A, a record including a device ID of 0x000c pertains to the present situation. At this stage, the registration state indicates "no registration". Thereafter, in step S606, the control unit 231 sends the confirmation code to the first communication device 101.

Returning to FIG. 5, in step S505, the system control unit 308 of the first communication device 101 receives and stores the confirmation code sent from the device management apparatus 103. Next, in step S506, the system control unit 308 sends a provisional registration request to the device management apparatus 103. This provisional registration request includes the owner identifier stored in step S501 and the device ID stored in step S503. Then, in step S507, the system control unit 308 displays the confirmation code stored in step S505 on the display unit 310. FIG. 8B shows a screen displayed on the first communication device 101 at this time. A confirmation code 805 and a button 806 that accepts an instruction for proceeding with processing are arranged on the display unit 310.

Moving to FIG. 6 again, in step S607, the control unit 231 of the device management apparatus 103 receives the provisional registration request sent from the first communication device 101. Then, in step S608, the control unit 231 performs provisional registration of the first communication device 101. Specifically, based on the device ID included in the provisional registration request, the control unit 231 searches the pairing management table shown in FIG. 4A for a corresponding record, and stores the owner identifier included in the provisional registration request into the corresponding record. The control unit 231 also issues provisional registration information and stores the provisional registration information into the corresponding record. The control unit 231 also issues an expiration date of the provisional registration information and stores the expiration date into the corresponding record. This expiration date is set based on the date and time of provisional registration. The control unit 231 further changes the registration state in the corresponding record from "no registration" to "provisional registration". In FIG. 4A, a record including a device ID of 0x000b includes "provisional registration" as the registration state. Thereafter, in step S609, the control unit 231 sends the provisional registration information issued in step S608 by an electronic mail based on the owner identifier.

Moving to FIG. 7, in step S701, the control unit 201 of the second communication device 102 receives the electronic mail including the provisional registration information sent from the device management apparatus 103. Next, in step S702, the control unit 201 sends an information obtainment request for obtaining a web page designated by the provisional registration information to the device management apparatus 103. This process is executed based on an operation of the operator of the second communication device 102. Here, the provisional registration information is a URL of a web page on which a confirmation code is input to be sent to the device management apparatus 103, and the URL varies with each device ID.

Returning to FIG. 6, in step S610, the control unit 231 of the device management apparatus 103 receives the information obtainment request sent from the second communication device 102. Then, the control unit 231 generates a web page in step S611, and sends the web page to the second communication device 102 in step S612. Here, based on the provisional registration information, the control unit 231 searches the pairing management table shown in FIG. 4A for a corresponding record, and sends the web page with a device ID in the corresponding record appended thereto. It should be noted that an ID for uniquely specifying a record may be issued and used in place of the device ID. By thus using information that is unique to each piece of provisional registration information, processing of official registration can be executed on a device-by-device basis, even in a case where the same person is executing processing of provisional registration for a plurality of devices.

Figure 9A:
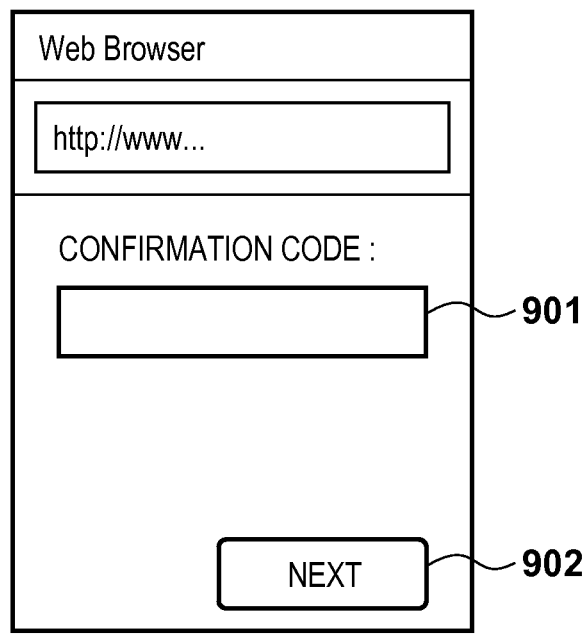
FIGS. 9A and 9B show screens displayed on a display unit of the second communication device.

Moving to FIG. 7 again, in step S703, the control unit 201 of the second communication device 102 receives the web page sent from the device management apparatus 103. This web page is configured to send a confirmation code from the second communication device 102 to the device management apparatus 103. The content of this web page is displayed as shown in FIG. 9A. Reference numeral 901 denotes a field to which the confirmation code is input, and reference numeral 902 denotes a button that accepts an instruction for proceeding with processing.

Next, in step S704, the control unit 201 accepts input of the confirmation code to the field 901 and selection of the button 902 based on an operation of the owner. Here, the confirmation code input by the owner is the confirmation code presented on the display unit 310 of the first communication device 101 in step S507. Then, in step S705, the control unit 201 sends the confirmation code input by the owner and the device ID appended to the web page to the device management apparatus 103.

Returning to FIG. 6, in step S613, the control unit 231 of the device management apparatus 103 receives the confirmation code and the device ID from the second communication device 102. Then, in step S614, the control unit 231 searches the pairing management table for a corresponding record based on the provisional registration information, which is the URL of the web page (the provisional registration information used by the second communication device 102 in step S702). The control unit 231 determines whether or not the current date and time have passed the provisional registration expiration date in the corresponding record. If the current date and time have not passed the provisional registration expiration date, the control unit 231 determines whether or not the confirmation code sent from the second communication device 102 (second confirmation code) matches the confirmation code in the corresponding record (first confirmation code). If the result of this determination shows that the confirmation codes match, the control unit 231 sends information for official registration (official registration information) to the second communication device 102 in step S615. Here, the control unit 231 sends the official registration information with the device ID appended thereto. On the other hand, if the result of determination in step S614 shows that the current date and time have passed the provisional registration expiration date or the confirmation codes do not match, the control unit 231 sends error information to the second communication device 102.

Figure 9B:
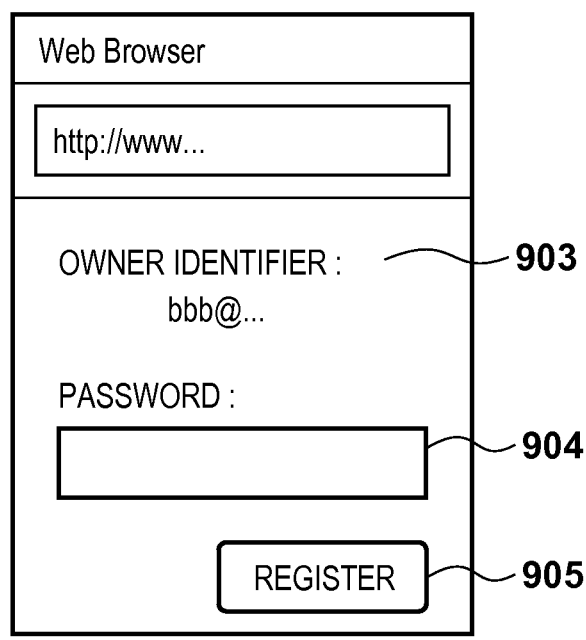

Moving to FIG. 7 again, in step S706, the control unit 201 of the second communication device 102 receives the official registration information sent from the device management apparatus 103. The official registration information, which is screen information such as a web page, is configured to allow the owner to send a password, and includes the owner identifier that was input by the owner to the first communication device 101 in step S501. The content of this web page is displayed as shown in FIG. 9B. Reference numeral 903 denotes the owner identifier, reference numeral 904 denotes a field that accepts input of the password, and reference numeral 905 denotes a button that accepts an instruction for proceeding with processing.

Next, in step S707, the control unit 201 of the second communication device 102 accepts input of the password to the field 904 and selection of the button 905 based on an operation of the owner. It should be noted that the control unit 201 may accept information other than the password, such as an address and a telephone number of the owner. In other words, the control unit 201 can accept various types of additional information for user registration in step S707.

Next, in step S708, the control unit 201 sends an official registration request to the device management apparatus 103. This official registration request includes additional information input by the owner, such as the password, and the device ID appended to the official registration information.

Returning to FIG. 6, in step S616, the control unit 231 of the device management apparatus 103 receives the official registration request from the second communication device 102. Then, in step S617, the control unit 231 changes the registration state from "provisional registration" to "official registration" (registration completion information) in a record of the pairing management table corresponding to the device ID included in the official registration request. Once the registration state becomes "official registration" in this way, processing for setting pairing between the owner and the first communication device 101 is completed. In FIG. 4A, a record including a device ID of 0x000a includes "official registration" as the registration state. The control unit 231 further registers, in the user management table shown in FIG. 4B, a record including the owner identifier associated with the device ID and the additional information included in the official registration request (in the example of FIG. 4B, the password). In this way, the user registration processing is completed.

If the owner further selects the button 806 on the first communication device 101 (FIG. 8B) thereafter, the system control unit 308 of the communication device 101 sends a registration state confirmation request to the device management apparatus 103. The registration state confirmation request includes the device ID. The control unit 231 of the device management apparatus 103 receives this registration state confirmation request, and sends information indicating the registration state to the first communication device 101. The system control unit 308 receives this information, and if it is determined that the registration state indicates official registration, the use of a service tied to the owner can be started.

In the present embodiment, the above-described flow allows pairing between the first communication device 101 and its owner to be set in a simple procedure. Also, in the present embodiment, setting of pairing and user registration of the owner can be performed in a flow sequence.

Furthermore, in the present embodiment, whether or not the owner is the owner of the first communication device 101 is confirmed via the provisional registration information and the confirmation code, and therefore it is also possible to prevent erroneous setting of pairing between the first communication device 101 and another person. That is to say, even if the provisional registration information is revealed to another person by the owner sending the provisional registration information to a destination of another person due to erroneous input of the owner identifier and the like, another person cannot find out the confirmation code displayed on the first communication device 101.

Furthermore, even if the provisional registration information is ever revealed to another person and he/she inputs a correct confirmation code by chance, a device ID can be re-issued to the owner through operation on the first communication device 101 in the present embodiment. In this way, an unauthorized use of the service by another person can be interrupted.

While the present embodiment adopts a configuration in which the pairing management table and the user management table are managed separately, the present embodiment may adopt a different configuration as long as equivalent information is managed. Also, the present embodiment has described a configuration in which pairing is not set for the first communication device 101 past the expiration date of the provisional registration information. In addition, the device management apparatus 103 may delete a corresponding record related to the first communication device 101 from the pairing management table at any time point past the expiration date.

Furthermore, while the first communication device 101 has been described as the image capturing apparatus in the present embodiment, the first communication device 101 may be another type of apparatus that can handle the owner identifier and the confirmation code similarly to the present embodiment. For example, the first communication device 101 may be a television, a video recorder, and an apparatus realized by a combination of a plurality of apparatuses.

Furthermore, according to the illustration of the present embodiment, the second communication device 102 is not configured to include a built-in display and keyboard. However, the second communication device 102 may be a mobile telephone, a smartphone, a tablet device, and the like.

Furthermore, while the registration state comes in three types, i.e., official registration, provisional registration, and no registration in the present embodiment, a state of provisional registration may not be included as the registration state 403 in the pairing management table; at the stage equivalent to provisional registration, the registration state 403 may still indicate no registration.

The following describes an operation of setting a service to be used after the above-described establishment of pairing between the first communication device 101 and the user of the second communication device 102 (the owner of the first communication device 101) who is considered a service user.

Figure 10:
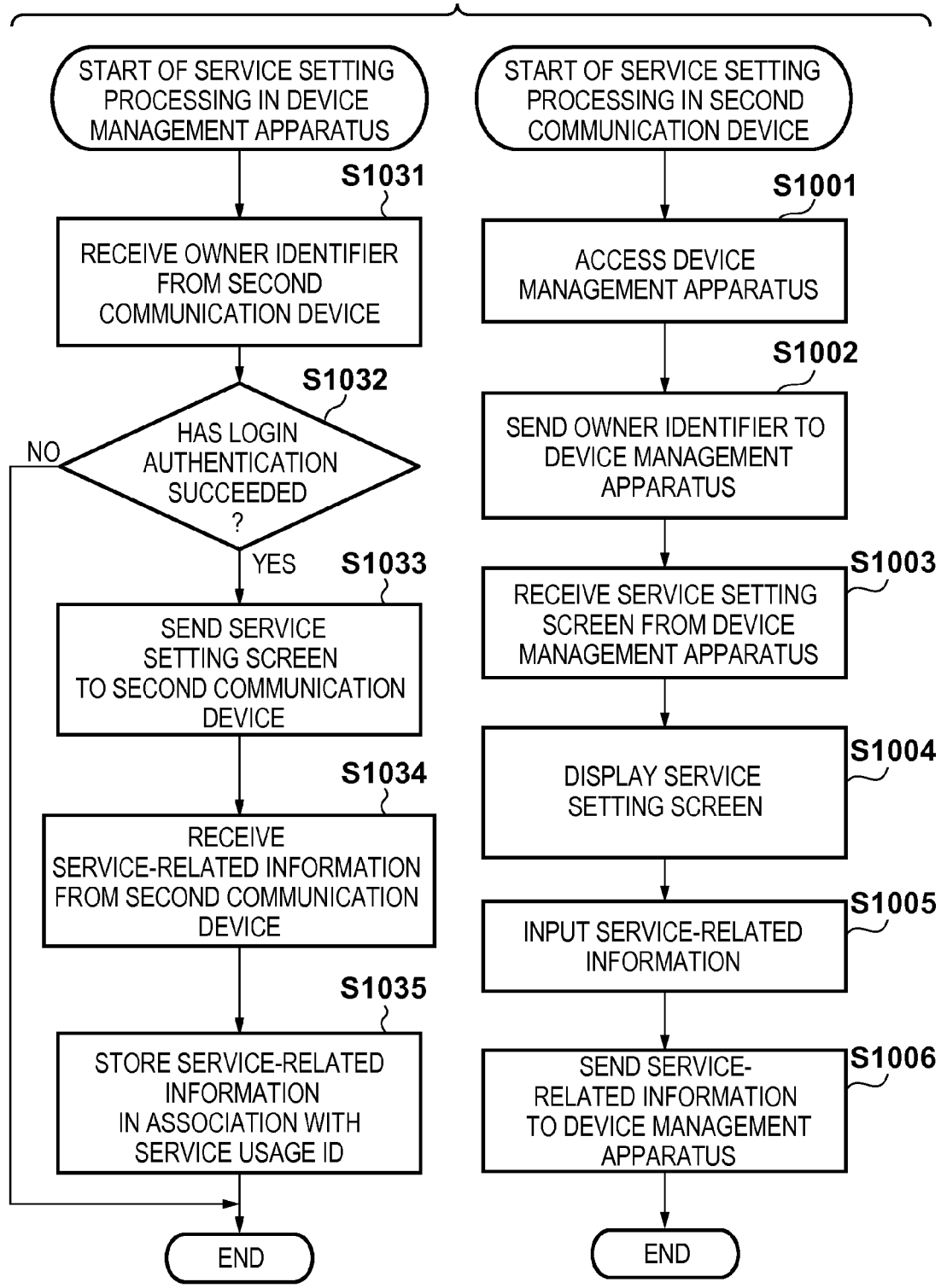
FIG. 10 is a flowchart showing one example of service setting processing in the second communication device and the device management apparatus according to the embodiment of the present invention.

First, service setting processing in the second communication device 102 and the device management apparatus 103 will be described with reference to FIG. 10. Below, an operation of the second communication device 102 is realized by the control unit 201 executing a control program stored in the storage apparatus 204, the ROM 202, and the like, and controlling the above-described modules in accordance with the control program. An operation of the device management apparatus 103 is realized by the control unit 231 executing a control program stored in the storage apparatus 234, the ROM 232, and the like, and controlling the above-described modules in accordance with the control program.

In response to an operation of the user, the control unit 201 of the second communication device 102 activates a web browser, and accesses the device management apparatus 103 via the network 104 based on an URL of a site of the device management apparatus 103 (step S1001). Then, in response to an operation of the user, the control unit 201 sends an owner identifier and a password to the device management apparatus 103 (step S1002).

The control unit 231 of the device management apparatus 103 receives the owner identifier and password from the second communication device 102 (step S1031), and performs login authentication by cross-referencing them with information in the pre-stored user management table (FIG. 4B). If the login authentication succeeds (YES of step S1032), the control unit 231 sends screen information for displaying a service setting screen to the second communication device 102 (step S1033).

The control unit 201 of the second communication device 102 receives the screen information of the service setting screen from the device management apparatus 103 (step S1003), and displays the service setting screen on the display apparatus 211 (step S1004). Then, in response to an operation of the user, service-related information related to service setting is input (step S1005) and sent to the device management apparatus 103 (step S1006). Here, the service-related information is, for example, a name for uniquely identifying another site to which an image of the first communication device 101 is to be transferred, account information or a mail address of that site, and the like.

The control unit 231 of the device management apparatus 103 receives the service-related information from the second communication device 102 (step S1034), and stores the service-related information into the storage apparatus 234 in association with a service usage ID (step S1035). It should be noted that the service usage ID is an identifier for uniquely specifying the service-related information of the user, and is stored into the pairing management table shown in FIG. 4A in association with the owner identifier and device ID.

After the service-related information has been stored (step S1035), if the second communication device 102 accesses the device management apparatus 103 again in accordance with an operation of the user (step S1001), the device management apparatus 103 sends the service setting screen including the service-related information (step S1033). Then, the second communication device 102 displays the service-related information on the service setting screen (step S1004), and inputs information for updating the existing service-related information and new service-related information (step S1005).

It should be noted that the control unit 231 of the device management apparatus 103 may send the screen information of the service setting screen to the second communication device 102 (step S1033) continuously after the pairing setting processing and the user registration processing are completed (see step S617 of FIG. 6). In this case, the control unit 201 of the second communication device 102 can omit, for example, an operation of sending the owner identifier and password (step S1002).

Figure 11:
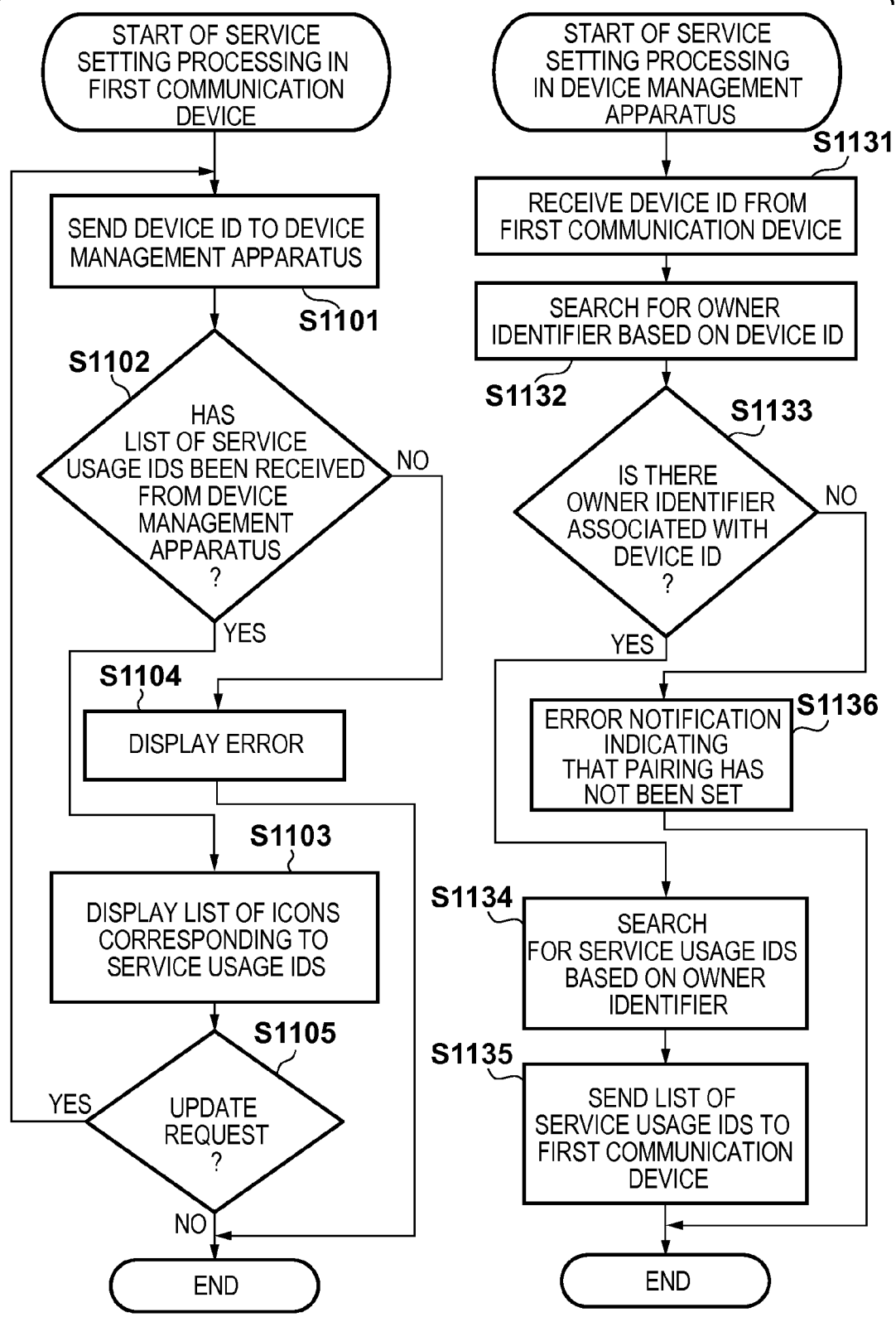
FIG. 11 is a flowchart showing one example of service setting processing in the first communication device and the device management apparatus according to the embodiment of the present invention.

Next, service setting processing in the first communication device 101 and the device management apparatus 103 will be described with reference to FIG. 11. Below, an operation of the first communication device 101 is realized by the system control unit 308 executing a control program stored in the non-volatile memory 312 and the like, and controlling the above-described modules in accordance with the control program. An operation of the device management apparatus 103 is realized by the control unit 231 executing a control program stored in the storage apparatus 234, the ROM 232, and the like, and controlling the above-described modules in accordance with the control program.

First, the system control unit 308 of the first communication device 101 reads a device ID and sends the device ID to the device management apparatus 103 (step S1101).

The control unit 231 of the device management apparatus 103 receives the device ID from the first communication device 101 (step S1131), and then searches the pairing management table in the storage apparatus 234 for an owner identifier that has been set in association with the device ID (step S1132). If the result of search shows that there is an owner identifier that has been set to pair with the device ID (YES of step S1133), service usage IDs stored in association with the device ID and the owner identifier are searched for, and a list of service usage IDs is generated in accordance with the result of search (step S1134). The device management apparatus 103 sends the list of service usage IDs to the first communication device 101 (step S1135). If the result of search shows that there is no owner identifier that has been set to pair with the device ID (NO of step S1133), device pairing has not been able to be performed, and therefore the control unit 231 notifies the first communication device 101 of error (step S1136).

If the control unit 201 of the first communication device 101 receives the list of service usage IDs from the device management apparatus 103 (YES of step S1102), it displays a list of icons corresponding to service usage IDs on the display unit 310 (step S1103). If it does not receive the list (NO of step S1102), it displays error (step S1104).

If the control unit 201 detects an update request in response to an operation of the user (YES of step S1105), the present processing returns to step S1101, and if the control unit 201 does not detect the update request (NO of step S1105), the present processing is ended.

Here, the icons displayed in a list are marks indicating the substances of service settings corresponding to the service usage IDs; for example, when the first communication device 101 uploads an image to the device management apparatus 103, a service usage ID corresponding to an icon selected by the user is also sent. In this way, for example, the device management apparatus 103 transfers the uploaded image to another apparatus in accordance with service usage setting related to the service usage ID.

As has been described above, the present embodiment allows pairing between the first communication device 101 and its owner to be set in a simple procedure. Also, in the present embodiment, setting of pairing and user registration of the owner can be performed in a flow sequence.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-254493, filed on Dec. 9, 2013, which is hereby incorporated by reference herein in its entirety.

What is claimed is:

1. A device management system including a first communication device, a second communication device, and a device management apparatus, the first communication device comprising:

a first processor; and a first memory storing a first program which, when executed by the first processor, causes the first communication device to:

send a device ID of the first communication device and an owner identifier corresponding to an owner of the first communication device to the device management apparatus;

receive a first confirmation code associated with the device ID from the device management apparatus; and display the first confirmation code, the device management apparatus comprising:

a second processor; and a second memory storing a second program which, when executed by the second processor, causes the device management apparatus to:

receive the device ID and the owner identifier from the first communication device;

generate the first confirmation code and provisional registration information that includes information for accessing the device management apparatus and is unique to the device ID;

record the device ID, the owner identifier, the first confirmation code, and the provisional registration information in association with one another; and send the first confirmation code to the first communication device and send the provisional registration information to the second communication device, and the second communication device comprising:

a third processor; and a third memory storing a third program which, when executed by the third processor, causes the second communication device to:

receive the provisional registration information from the device management apparatus;

obtain a second confirmation code input via an input interface; and send the second confirmation code to the device management apparatus by accessing the device management apparatus in accordance with the provisional registration information, wherein the second program when executed by the second processor further causes the device management apparatus to receive the second confirmation code from the second communication device, determine whether or not the second confirmation code matches the first confirmation code associated with the provisional registration information that has been used the second communication device to send the second confirmation code, and record registration completion information indicating that registration of a pair of the device ID and the owner identifier associated with the provisional registration information has been completed if the second confirmation code matches the first confirmation code.

2. A communication device comprising:
a processor; and
a memory storing a program which, when executed by the processor, causes the communication device to:
send a device ID of the communication device and an owner identifier corresponding to an owner of the communication device to a device management apparatus;
receive a first confirmation code associated with the device ID from the device management apparatus;
display the first confirmation code;
send a registration state confirmation request including the device ID to the device management apparatus; and
receive information indicating a registration state of a pair of the device ID and the owner identifier from the device management apparatus as a response to the registration state confirmation request.

3. A device management apparatus comprising:
a processor; and
a memory storing a program which, when executed by the processor, causes the device management apparatus to:
receive a device ID of a first communication device and an owner identifier corresponding to an owner of the first communication device from the first communication device;
generate a first confirmation code and provisional registration information that includes information for accessing the device management apparatus and is unique to the device ID;
record the device ID, the owner identifier, the first confirmation code, and the provisional registration information in association with one another;
send the first confirmation code to the first communication device and send the provisional registration information to a second communication device;
receive, from the second communication device, a second confirmation code that has been sent in accordance with the provisional registration information,
determine whether or not the second confirmation code matches the first confirmation code associated with the provisional registration information that has been used by the second communication device to send the second confirmation code, and if the second confirmation code matches the first confirmation code, record registration completion information indicating that registration of a pair of the device ID and the owner identifier associated with the provisional registration information has been completed.

4. The device management apparatus according to claim 3, wherein the owner identifier from the first communication device is received after sending the first confirmation code.

5. The device management apparatus according to claim 3, wherein the program when executed by the processor further causes the device management apparatus
to receive additional information input to the second communication device from the second communication device, and
if the second confirmation code matches the first confirmation code, the additional information is recorded in association with the owner identifier.

6. The device management apparatus according to claim 5, wherein the program when executed by the processor further causes the device management apparatus to
send, to the second communication device, screen information for inputting the additional information to the second communication device if the second confirmation code matches the first confirmation code, and
receive, from the second communication device, the additional information input to the second communication device via the screen information.

7. The device management apparatus according to claim 3, wherein the program when executed by the processor further causes the device management apparatus to
receive a device ID issuance request from the first communication device, and
generate the device ID in response to the device ID issuance request.

8. The device management apparatus according to claim 3, wherein the program when executed by the processor further causes the device management apparatus to
receive a confirmation code issuance request from the first communication device, and
generate the first confirmation code in response to the confirmation code issuance request.

9. The device management apparatus according to claim 3, wherein the program when executed by the processor further causes the device management apparatus to
generate an expiration date based on a date and time when the provisional registration information is generated,
record the expiration date in association with the provisional registration information, and
record the registration completion information if the second confirmation code matches the first confirmation code and a date and time of reception of the second confirmation code precede the expiration date.

10. The device management apparatus according to claim 3, wherein the program when executed by the processor further causes the device management apparatus to
receive a registration state confirmation request including the device ID from the first communication device, and
send, to the first communication device, information indicating a registration state of the pair of the device ID and the owner identifier based on the registration completion information.

11. A control method for a communication device, the control method comprising:
sending a device ID of the communication device and an owner identifier corresponding to an owner of the communication device to a device management apparatus;

receiving a first confirmation code associated with the device ID from the device management apparatus;

displaying the first confirmation code;

sending a registration state confirmation request including the device ID to the device management apparatus; and receiving information indicating a registration state of a pair of the device ID and the owner identifier from the device management apparatus as a response to the registration state confirmation request.

12. A control method for a device management apparatus, the control method comprising:

receiving a device ID of a first communication device and an owner identifier corresponding to an owner of the first communication device from the first communication device;

generating a first confirmation code and provisional registration information that includes information for accessing the device management apparatus and is unique to the device ID;

recording the device ID, the owner identifier, the first confirmation code, and the provisional registration information in association with one another; and sending the first confirmation code to the first communication device and sending the provisional registration information to a second communication device, wherein receiving, from the second communication device, a second confirmation code that has been sent in accordance with the provisional registration information, determining whether or not the second confirmation code matches the first confirmation code associated with the provisional registration information that has been used by the second communication device to send the second confirmation code, and if the second confirmation code matches the first confirmation code, recording registration completion information indicating that registration of a pair of the device ID and the owner identifier associated with the provisional registration information has been completed.

13. A non-transitory computer-readable storage medium which stores a program for causing a computer to execute a control method for a communication device, the control method comprising:

sending a device ID of the communication device and an owner identifier corresponding to an owner of the communication device to a device management apparatus;

receiving a first confirmation code associated with the device ID from the device management apparatus;

displaying the first confirmation code;

sending a registration state confirmation request including the device ID to the device management apparatus; and receiving information indicating a registration state of a pair of the device ID and the owner identifier from the device management apparatus as a response to the registration state confirmation request.

14. A non-transitory computer-readable storage medium which stores a program for causing a computer to execute a control method for a device management apparatus, the control method comprising:

receiving a device ID of a first communication device and an owner identifier corresponding to an owner of the first communication device from the first communication device;

generating a first confirmation code and provisional registration information that includes information for accessing the device management apparatus and is unique to the device ID;

recording the device ID, the owner identifier, the first confirmation code, and the provisional registration information in association with one another; and sending the first confirmation code to the first communication device and sending the provisional registration information to a second communication device, wherein receiving, from the second communication device, a second confirmation code that has been sent in accordance with the provisional registration information, determining whether or not the second confirmation code matches the first confirmation code associated with the provisional registration information that has been used by the second communication device to send the second confirmation code, and if the second confirmation code matches the first confirmation code, recording registration completion information indicating that registration of a pair of the device ID and the owner identifier associated with the provisional registration information has been completed.

* * * * *